United States Patent
Lippert et al.

(10) Patent No.: US 11,685,192 B2
(45) Date of Patent: Jun. 27, 2023

(54) PNEUMATIC VEHICLE TIRE

(71) Applicant: Continental Reifen Deutschland GmbH, Hannover (DE)

(72) Inventors: Frank Lippert, Lehrte (DE); Florian Kristen, Hannover (DE); Christian Meiners, Hannover (DE); Paul Naglatzki, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 132 days.

(21) Appl. No.: 16/487,984

(22) PCT Filed: Jan. 15, 2018

(86) PCT No.: PCT/EP2018/050803
§ 371 (c)(1),
(2) Date: Aug. 22, 2019

(87) PCT Pub. No.: WO2018/153569
PCT Pub. Date: Aug. 30, 2018

(65) Prior Publication Data
US 2020/0023686 A1   Jan. 23, 2020

(30) Foreign Application Priority Data
Feb. 24, 2017   (DE) ..................... 10 2017 203 012.7

(51) Int. Cl.
*B60C 11/01* (2006.01)
*B60C 23/19* (2006.01)

(52) U.S. Cl.
CPC .............. *B60C 11/01* (2013.01); *B60C 23/19* (2013.01); *B60C 2011/013* (2013.01); *B60C 2200/06* (2013.01)

(58) Field of Classification Search
CPC ... B60C 11/01; B60C 2011/013; B60C 13/02; B60C 23/19
See application file for complete search history.

(56) References Cited

U.S. PATENT DOCUMENTS

| 2003/0116246 A1 | 6/2003 | Kuroda | |
| 2010/0000641 A1* | 1/2010 | Morito | ................ B60C 11/0302 152/209.8 |
| 2018/0065422 A1* | 3/2018 | Kuwano | ................ B60C 13/02 |

FOREIGN PATENT DOCUMENTS

| CN | 1421329 A | 6/2003 |
| EP | 1314581 A1 | 5/2003 |

(Continued)

OTHER PUBLICATIONS

International Search Report dated Apr. 23, 2018 of international application PCT/EP2018/050803 on which this application is based.

*Primary Examiner* — Timothy Kennedy
*Assistant Examiner* — Farah Taufiq
(74) *Attorney, Agent, or Firm* — Gregory Adams; David L. Cate

(57) ABSTRACT

A pneumatic vehicle tire, in particular a commercial-vehicle tire, having a one- or multi-ply carcass, a multi-ply belt or breaker and having a profiled tread with grooves formed to a profile depth, wherein the profiled tread is provided at the tire shoulders either with a respective block row (2) or with a respective profile rib (7), wherein the blocks (1) of the shoulder-side block rows (2), or the shoulder-side profile ribs (7) each have a peripheral edge (1a, 7a) laterally delimiting the ground contact patch of the tire, or a shoulder rounding with a radius of up to 30.0 mm, wherein shoulder flank surfaces that extend in a radial direction adjoin the peripheral edges or the shoulder roundings, and wherein, in the case of shoulder roundings, an imaginary section line is defined between an envelope of the tread that is continued (Continued)

Figure 1:
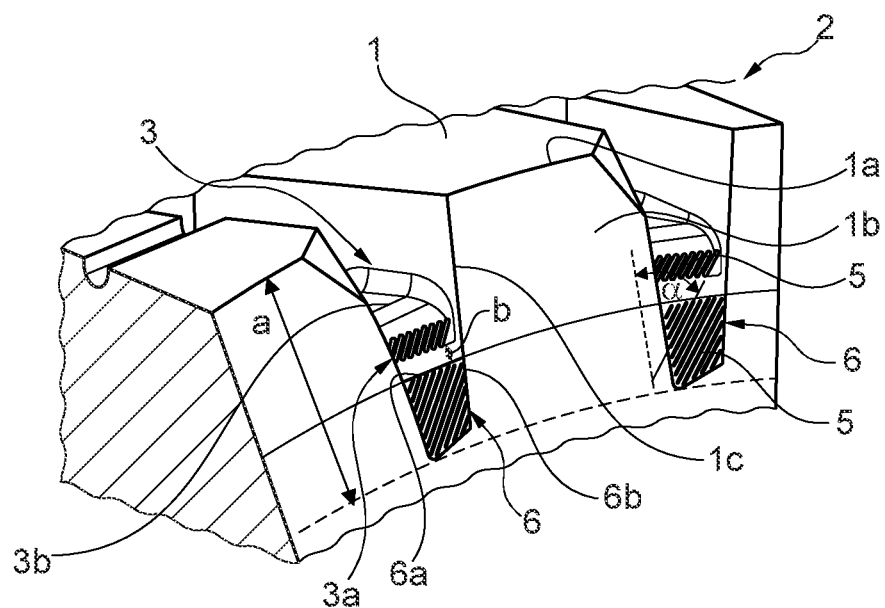

beyond the shoulder rounding and the shoulder flank surface that is continued beyond the shoulder rounding.

The shoulder flank surfaces are provided, at in particular regular intervals over the tire circumference and within a distance (a) of 1.25 times to 2.5 times the profile depth from the respective peripheral edge (1*a*, 7*a*) or, in the case of shoulder roundings, from the imaginary section line, with at least one areal recess (6, 6', 6") having a depth (t) of 0.5 mm to 5.0 mm, which contains ribs (5) that extend parallel to one another and have a height (h) such that the ribs (5) do not project beyond the level of the shoulder flank surfaces.

12 Claims, 2 Drawing Sheets

(56) References Cited

FOREIGN PATENT DOCUMENTS

| | | | |
|---|---|---|---|
| JP | S63130407 A | | 6/1988 |
| JP | 06-013904 U | * | 1/1994 |
| JP | H11151910 A | | 6/1999 |
| JP | 2000006615 A | * | 1/2000 |
| JP | 2003211915 A | | 7/2003 |
| JP | 2006027498 A | | 2/2006 |
| JP | 2006168379 A | | 6/2006 |
| JP | 2010132042 A | | 6/2010 |
| JP | 2010132043 A | | 6/2010 |

* cited by examiner

PNEUMATIC VEHICLE TIRE

The invention relates to a pneumatic vehicle tire, in particular a commercial-vehicle tire, having a one- or multi-ply carcass, a multi-ply belt or breaker and having a profiled tread with grooves formed to a profile depth, wherein the profiled tread is provided at the tire shoulders either with a respective block row or with a respective profile rib, wherein the blocks of the shoulder-side block rows, or the shoulder-side profile ribs each have a peripheral edge laterally delimiting the ground contact patch of the tire, or a shoulder rounding with a radius of up to 30.0 mm, wherein shoulder flank surfaces that extend in a radial direction adjoin the peripheral edges or the shoulder roundings, and wherein, in the case of shoulder roundings, an imaginary section line is defined between an envelope of the tread that is continued beyond the shoulder rounding and the shoulder flank surface that is continued beyond the shoulder rounding.

Depending on their intended use, pneumatic vehicle tires usually have either a tread with a block profile having shoulder-side profile block rows or a tread profile with shoulder-side profile ribs. Tires with block profiles have transverse grooves that open outward in the tire shoulders and, depending on the profile design, can also be at relatively large distances from one another. In order to improve the wear properties and the performance of the tire, what are known as block attachments or bottom elevations are provided, in particular in commercial-vehicle tires of large dimensions, in shoulder-side transverse grooves in order to stabilize the tire shoulders. In particular commercial-vehicle tires for specific purposes, for example tires for straddle carriers, have a large amount of rubber material in the shoulder-side tread regions, with the result that these regions heat up relatively greatly while the tires are running. Insufficient cooling or excessive development of heat in the rubber material results in an undesirably high temperature build-up, which not only has a negative effect on the tire performance but is also disadvantageous for the durability of the belt or breaker edges located on the inside close to the shoulder regions.

Therefore, the invention is based on the object, in pneumatic vehicle tires of the type mentioned at the beginning, of providing simple but effective measures for improving cooling and heat dissipation in the region of the tire shoulders.

The stated object is achieved according to the invention in that the shoulder flank surfaces are provided, at in particular regular intervals over the tire circumference and within a distance of 1.25 times to 2.5 times the profile depth from the respective peripheral edge or, in the case of shoulder roundings, from the imaginary section line, with at least one areal recess having a depth of 0.5 mm to 5.0 mm, which contains ribs that extend parallel to one another and have a height such that the ribs do not project beyond the level of the shoulder flank surfaces.

By way of the ribs, in that region of the tire shoulders in which, as a result of a large amount of rubber material, relatively high development of heat takes place while the tires are running, the rubber surface is enlarged and as a result the heat dissipation in this region improved.

In a preferred embodiment of the invention, the recesses have a radial extent of 10% to 70% of the profile depth and an extent in the circumferential direction of 70% to 120% of the profile depth. The present recesses are therefore preferably provided locally, with a limited size, over the circumference of the shoulder flank surfaces. In particular the extent in the circumferential direction can also be greater, however, wherein a single recess which is formed in an annularly encircling manner over the shoulder flank surface and the bottom of which is covered in particular with ribs also be provided.

In a preferred embodiment of the invention, in each case two recesses that are arranged one above the other in the radial direction are provided, the smallest distance between said recesses being 2.0 mm. This measure allows targeted positioning of the recesses provided or covered with ribs close to those points on the shoulder flank surfaces at which support of the dissipation of heat is particularly advantageous.

The areal recesses are furthermore preferably designed in a quadrilateral manner, but can have areas of any shape in plan view.

In pneumatic vehicle tires that are provided with shoulder-side block rows, the blocks of which are separated from one another by transverse grooves that open outward at the respective shoulder flank surface, provision can be made for the groove bottoms of the transverse grooves to be provided with end portions that extend substantially in the radial direction over 10% to 30% of the profile depth and are offset inwardly with respect to the respective shoulder flank surface, said end portions likewise being covered with ribs that do not project beyond the level of the shoulder flank surface. This measure makes it possible to provide support for heat dissipation in the particularly sensitive regions of shoulder-side transverse grooves that have block attachments or bottom elevations and therefore exhibit a relatively large amount of rubber material.

Preference is furthermore given to an embodiment in which the ribs have a width of 1.0 mm to 5.0 mm at their base, the mutual center-to-center spacing of adjacent ribs of which is in particular 1.2 mm to 7.0 mm. The ribs furthermore have a height of 0.5 mm to 5.0 mm. The actual dimensioning of the ribs depends on the desired cooling action and on the size of the commercial-vehicle tire for which these measures are taken.

The cross section of the ribs is in particular trapezoidal or semicircular.

Around the tire circumference, it is advantageous for the recesses to be provided at distances of 5 cm to 15 cm.

Figure 2:
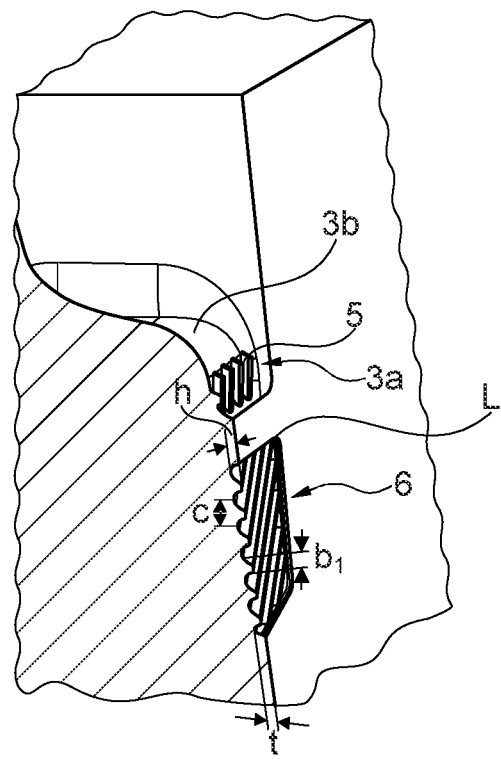
Figure 3:
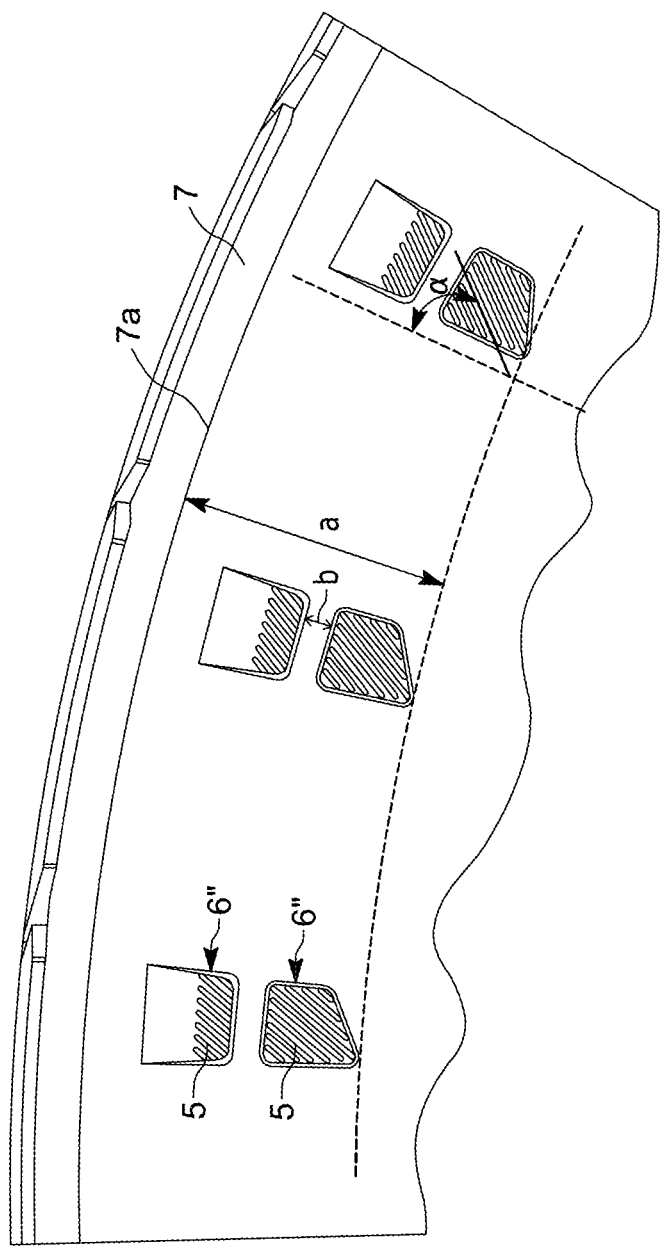

Further features, advantages and details of the invention will now be described in more detail on the basis of the schematic drawing, which illustrates exemplary embodiments and in which FIG. 1 shows an oblique view of a circumferential portion of a tread of a pneumatic vehicle tire in the region of a tire shoulder with one embodiment of the invention, FIG. 2 shows a sectional illustration along the section plane indicated by the line II-II in FIG. 1, and FIG. 3 shows a view of a circumferential portion of a shoulder flank of a pneumatic vehicle tire according to a further embodiment variant of the invention.

Pneumatic vehicle tires embodied according to the invention are in particular off-road tires or commercial-vehicle tires for a wide variety of purposes, preferably large-size commercial-vehicle tires for rim diameters of at least 24 inches. Such tires are for example tires for straddle carriers, reach stackers or container stackers. Tires embodied according to the invention have a one- or multi-ply carcass, either in the form of a radial carcass or of a diagonal carcass, and a multi-ply belt assembly or several breaker plies.

FIG. 1 shows, from a commercial-vehicle tire, which is for example a tire for reach stackers or container stackers, having a pronounced block profile in the tread, blocks 1 of a shoulder-side block row 2. The blocks 1 have tire-shoulder-side peripheral edges 1*a*, which laterally delimit the ground contact patch of the tread and are separated from one another in the circumferential direction by transverse grooves 3. The transverse grooves 3 and/or further grooves (not illustrated) in the tread have the provided profile depth, which, in commercial-vehicle tires, can be in the region of 12 mm to 95 mm. The blocks 1 have shoulder-side block flanks 1*b*, which are delimited in the circumferential direction by block edges 1*c* extending in the radial direction and form a shoulder flank surface together with the surrounding flank region immediately adjoining in the radial direction.

The groove bottom 3*b* of each transverse groove 3 has an end portion 3*a* that extends substantially parallel to the shoulder flank surface and is offset inwardly with respect to the shoulder flank surface in particular by up to in particular up to 7.0 mm and has, in the radial direction, an extent of 10% to 30% of the profile depth. The substantially rectangular end portions 3*a* are covered with ribs 5 that extend parallel to one another and do not project beyond the level of the shoulder flank surface.

Located radially on the inside of the end portion 3*a*, provided with ribs 5, of each transverse groove 3 is a recess 6, likewise provided, in particular covered with ribs 6, with an in particular constant depth t of 0.5 mm to 5.0 mm. The ribs 5 located at the bottom of the recess 6 have a height h that corresponds at most to the depth t. The recesses 6 are located radially outside a distance a of 1.25 times to 2.5 times the profile depth from the peripheral edge 1*a*.

In the embodiment shown, the recess 6 is in the shape of a quadrilateral, with a radially outer edge 6*a*, extending in particular in the circumferential direction, the smallest distance b of which from the radially inner end of the end portion 3*a* is 2.0 mm to 10.0 mm.

The maximum extent of the recess 6 in the circumferential direction is 70% to 120% of the circumferential extent of the end portion 3*a*. In the preferred embodiment illustrated, the recess 6 has side edges 6*b* that extend in the radial direction and extend in continuation of the block edges 1*c*. The side edges 6*b* of the recesses 6 can also extend otherwise, however, in particular at an angle of 0° to 45° to the radial direction.

The ribs 5 have a height h of 0.5 mm to 5 mm, in particular at least 3.0 mm. As shown in particular in FIG. 2, the ribs 5 are substantially isosceles trapezoids in cross section, the width $b_1$ of which at the base of their cross section is 1.0 mm to 5.0 mm, and the mutual spacing c of the ribs 5—in each case center-to center—is 1.2 mm to 7.0 mm. The ribs 5 can also be embodied in a rounded manner, for example a semicircular manner, in cross section. As shown for example in FIG. 1, the ribs 5 extend at an acute angle α of 10° to 75°, in particular 20° to 40°, to the radial direction. All of the ribs 5 within the end portions 3*a* and the recesses 6 are preferably identically embodied and arranged.

The ribs 5 bring about an enlargement of the outer surface of the tire at the tire shoulders and therefore act as cooling ribs, which support dissipation of the heat from the rubber material in the tire shoulders. The inclined position of the ribs 5 at the abovementioned angle α has the advantage that the air that sweeps past while the tire is rolling further improves heat dissipation.

In the embodiment variant shown in FIG. 3, the tread has a shoulder rib 7 in place of a block row on the shoulder side, such that a uniform shoulder flank surface that is not interrupted by transverse ribs is present at the tire shoulders radially inside the peripheral edge 7*a* of the shoulder rib 7. In this embodiment variant, too, recesses 6' having ribs 5, as described above, are provided. Located radially outside each recess 6' is a further recess 6", which is provided with ribs 5 in its radially inner half in the embodiment shown. The recesses 6', 6" are each arranged one above the other in pairs and are located within the distance a from the peripheral edge 7*a*.

Depending on the tire size, the recesses 6, 6' are provided at distances of 5 cm to 15 cm around the tire circumference. In alternative embodiments of the pneumatic vehicle tire according to the invention, the peripheral edges 1*a* are can rounded with a radius of in particular 1.0 mm to 30.0 mm or provided with a bevel with a width of up to 5.0 mm. The distance a is determined in these embodiments from an imaginary section line between an envelope of the tread that continues beyond the shoulder rounding or bevel and the shoulder flank surface that is continued beyond the shoulder rounding or bevel.

LIST OF REFERENCE SIGNS

1 . . . Block
1*a* . . . Peripheral edge
1*b* . . . Shoulder flank
1*c* . . . Block edge
2 . . . Block row
3 . . . Transverse groove
3*a* . . . End portion
3*b* . . . Groove bottom
5 . . . Rib
6, 6', 6" . . . Recess
6*a* . . . Edge
6*b* . . . Side edge
7 . . . Shoulder rib
7*a* . . . Peripheral edge
a, b, c . . . Distance
$b_1$ . . . Width
h . . . Height
t . . . Depth

The invention claimed is:

1. A pneumatic vehicle tire comprising a carcass having at least one ply, a multi-ply belt or breaker, and a profiled tread with grooves formed to a profile depth, wherein the profiled tread is provided at tire shoulders a shoulder-side block row;
wherein blocks of the shoulder-side block row each have a one of a peripheral edge laterally delimiting the ground contact patch of the pneumatic vehicle tire, or a shoulder rounding with a radius of up to 30.0 mm;
wherein shoulder flank surfaces that extend in a radial direction adjoin the peripheral edges or the shoulder roundings, and wherein, in the case of shoulder roundings, an imaginary section line is defined between an envelope of the tread that is continued beyond the shoulder rounding and the shoulder flank surface that is continued beyond the shoulder rounding;
wherein the shoulder flank surfaces are provided, at in particular regular intervals over a circumference of the pneumatic vehicle tire and within a distance of 1.25 times to 2.5 times the profile depth from the respective peripheral edge or, in the case of shoulder roundings, from an imaginary section line; and,
wherein the blocks shoulder-side block rows are separated from one another by transverse grooves that open outward at the shoulder flank surface, wherein groove bottoms of the transverse grooves have end portions that extend in the radial direction over 10% to 30% of the profile depth and are offset inwardly with respect to the shoulder flank surface, the end portions likewise being provided with the ribs that do not project beyond the level of the shoulder flank surfaces;

the end portion of each transverse groove comprises an upper recess and a lower recess separated by a radial distance of at least 2.0 mm;

the upper recess and the lower recess comprising cooling ribs arranged at an angle alpha, the angle alpha configured to facilitate heat dissipation while the tire is rolling, the above recess having less than half the surface area of the other recess of the at least two recesses and separated by a distance b.

2. The pneumatic vehicle tire as claimed in claim 1, wherein the upper recess and the lower recess have a radial extent of 10% to 70% of the profile depth.

3. The pneumatic vehicle tire as claimed in claim 1, wherein the upper recess and the lower recess are designed in a quadrilateral manner.

4. The pneumatic vehicle tire as claimed in claim 1, wherein the cooling ribs have a width of 1.0 mm to 5.0 mm at their base.

5. The pneumatic vehicle tire as claimed in claim 1, wherein the cooling ribs have a mutual center-to-center spacing of 1.2 mm to 7.0 mm.

6. The pneumatic vehicle tire as claimed in claim 1, wherein the cooling ribs have a height of 0.5 mm to 5.0 mm.

7. The pneumatic vehicle tire as claimed in claim 1, wherein the recesses are provided at spacings of 5 cm to 15 cm over the circumference of the pneumatic vehicle tire.

8. The pneumatic vehicle tire as claimed in claim 1, the upper recess and the lower recess have an extent in the circumferential direction of 70% to 120% of the profile depth.

9. The pneumatic vehicle tire as claimed in claim 1, the lower recess has a quadrilateral shape.

10. The pneumatic vehicle tire as claimed in claim 1, the peripheral edges being rounded.

11. The pneumatic vehicle tire as claimed in claim 1, the tire has a rim diameter of at least 24 inches.

12. The pneumatic vehicle tire as claimed in claim 1, the ribs have an isosceles trapezoids shape in cross section.

\* \* \* \* \*